United States Patent
Hirooka

(10) Patent No.: US 7,627,407 B2
(45) Date of Patent: Dec. 1, 2009

(54) FAULT DETERMINATION DEVICE AND METHOD OF NEGATIVE PRESSURE GENERATION DEVICE

(75) Inventor: Shigemasa Hirooka, Susono (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 218 days.

(21) Appl. No.: 11/808,899

(22) Filed: Jun. 13, 2007

(65) Prior Publication Data

US 2008/0015769 A1    Jan. 17, 2008

(30) Foreign Application Priority Data

Jul. 13, 2006 (JP) .............................. 2006-192599

(51) Int. Cl.
*G01M 15/02* (2006.01)

(52) U.S. Cl. .................. 701/34; 701/101; 701/102; 701/103; 123/200; 123/205; 123/207; 123/208; 123/319; 123/332; 123/333; 123/339.1; 123/339.12; 123/339.19; 477/121; 475/1; 475/2; 475/6

(58) Field of Classification Search .................. 701/34, 701/101, 102, 103; 123/200, 205, 207, 208, 123/319, 332, 339.1, 339.12, 339.19; 477/121; 475/1, 2, 6

See application file for complete search history.

(56) References Cited

U.S. PATENT DOCUMENTS 5,526,793 A * 6/1996 Johansson ................... 123/481
2007/0180852 A1* 8/2007 Sugiura et al. .............. 62/500

FOREIGN PATENT DOCUMENTS

JP          09317700 A   * 12/1997
JP       A 2005-188332      7/2005

OTHER PUBLICATIONS

English abstract of JP 09317700.*

* cited by examiner

*Primary Examiner*—Khoi Tran
*Assistant Examiner*—Nikhil Sriraman
(74) *Attorney, Agent, or Firm*—Oliff & Berridge, PLC

(57) ABSTRACT

An ECU determines the presence/absence of a fault of a negative pressure generation device that has an ejector that generates a negative pressure that is greater than the negative pressure that is to be extracted from an intake manifold of an internal combustion engine, and a VSV that causes the ejector to function or stop functioning. The ECU includes a presence/absence-of-abnormality determination portion that determines the presence/absence of an abnormality of the negative pressure generation device on the basis of variation of the rotation speed Ne of the internal combustion engine in accordance with change in the state of operation of the VSV.

7 Claims, 12 Drawing Sheets

NEGATIVE PRESSURE GENERATION DEVICE 100: 1,30

NEGATIVE PRESSURE GENERATION DEVICE 100: 1,30

NEGATIVE PRESSURE GENERATION DEVICE 100: 1,30

FAULT DETERMINATION DEVICE AND METHOD OF NEGATIVE PRESSURE GENERATION DEVICE

INCORPORATION BY REFERENCE

The disclosure of Japanese Patent Application No. 2006-192599 filed on Jul. 13, 2006 including the specification, drawings and abstract is incorporated herein by reference in its entirety.

BACKGROUND OF THE INVENTION

1. Field of the Invention

The invention relates to a fault determination device and a fault determination method of a negative pressure generation device. More particularly, the invention relates to a fault determination device of a negative pressure generation device which determines the presence/absence of an abnormality of the negative pressure generation device that has an ejector and which determines a cause of the abnormality.

2. Description of the Related Art

In vehicles, an ejector has been used to supply a brake booster with a negative pressure that is greater than the negative pressure that is to be extracted from an intake passageway of an intake system of an internal combustion engine (hereinafter, also referred to simply as "the intake system of the internal combustion engine") that connects in communication from the atmosphere to the cylinders of the engine. Generally, the ejector is disposed in a bypass that bypasses the throttle valve, and generates great negative pressure due to the Venturi effect. With regard to the ejector, Japanese Patent Application Publication No. 2005-188332 discloses, for example, an ejector device shown below. This ejector device has switch means for switching between the operation and the non-operation of the ejector, and clog determination means for determining whether or not a channel of the ejector is clogged on the basis of a difference between the amounts of air that are taken into an intake pipe before and after the operation switching performed by the switch means. That is, the ejector device proposed by the Japanese Patent Application Publication No. 2005-188332 is a technology of determining the occurrence of a clogging of a channel of the ejector on the basis of a fact that operation of the ejector cause the intake air flow amount to vary, that is, on condition that no change occur in the intake air flow amounts before and after the operation switching, the technology determines that the ejector has a channel clogging.

However, according to the foregoing related art, there is a possibility of failing to correctly determine that the ejector has a channel clogging in a situation shown below. The manner of connection of a bypass to the intake passageway may be, for example, connection upstream of the bypass to the intake passageway upstream of intake air flow amount detection means (e.g., an air flow meter). In this case, the bypass extends around not only the throttle valve but also the intake air flow amount detection means. Therefore, in this case, the intake air flowing through the bypass is not detected by the intake air flow amount detection means, and therefore, the related art always falsely determines that the ejector has a channel clogging. That is, in such a case, the aforementioned related art cannot be applied to the determination regarding the channel clogging. Furthermore, for example, even in the case where the bypass does not extend around the intake air flow amount detection means, there is also a possibility of failing to correctly detect a change in the intake air flow amount if the detection performance deteriorates because of adhering a foreign substance or if a fault occurs, or the like. Still further, the amount of change in the intake air flow amount is small in comparison with the total intake air flow amount, and it is not easy to distinguish a change in the intake air flow amount from an external disturbance or the like. As a result, a false determination of an external disturbance or the like as the change in the intake air flow amount ascribable to a channel clogging is conceivable.

Furthermore, if a deposit adheres to the throttle valve as a time-dependent change, the intake air flow amount at a fixed degree of throttle opening changes. At the same time, it is considered that in this case, the amount of change in the intake air flow amount in accordance with the operation and the non-operation of the ejector is also considered to change, and therefore a possibility of decline in the accuracy of determination is also considered to exist. Furthermore, for example, in the case where an increasing/decreasing correction of the intake air flow amount is performed so as to restrain variation of the idle rotation speed by an ISC (Idle Speed Control) in accordance with change in the state of operation of state change means, a normal state is a state where the rotation speed and the intake air flow amount of the internal combustion engine undergo substantially no change before and after the operation switching of the ejector. In this case, the aforementioned related art determines that the ejector has a channel clogging while the ejector is actually normal, and therefore the related art cannot be applied.

The cause of abnormality that occurs in the negative pressure generation device is not limited to the channel clogging. For example, it is conceivable as a cause that suction of atmospheric air is occurring in the negative pressure generation device because an air hose forming the bypass is disconnected or a crack or a hole is formed in the air hose. As other causes of abnormality, it is also conceivable that the state change means has an operation failure, so that the channel is fixed in a closed state and the ejector cannot be caused to function, or so that the channel is fixed in an open state and the ejector cannot be caused to stop functioning, or the like. Since a plurality of causes of abnormality are conceivable as indicated above, it is advantageous that if an abnormality occurs in the negative pressure generation device, it is possible to not only determine the presence/absence of an abnormality but also determine a cause of the abnormality. This makes it possible to easily detect a site of abnormality and promptly cope with the abnormality and therefore take an appropriate countermeasure, such as performing a tentative coping control in accordance with the cause of abnormality, etc.

SUMMARY OF THE INVENTION

Accordingly, it is an object of the invention to provide a fault determination device of a negative pressure generation device that is capable of suitably determining the presence/absence of an abnormality of the negative pressure generation device and determining a cause of the abnormality.

A first aspect of the invention relates to a fault determination device of a negative pressure generation device having an ejector that generates a negative pressure that is greater than the negative pressure that is to be extracted from an intake passageway of an intake system of an internal combustion engine, and an operation state change device that causes the ejector to function or stop functioning. This fault determination device of the negative pressure generation device includes a presence/absence-of-abnormality determination portion that determines presence/absence of an abnormality of the negative pressure generation device based on a variation of rotation speed of the internal combustion engine that is in accordance with a change in a state of operation of the operation state change device. If the intake air flow amount changes, the changed intake air flow amount is directly supplied to the internal combustion engine. That is, a change in the intake air flow amount results in a variation of the rotation speed of the internal combustion engine, regardless of whether or not the change in the intake air flow amount is detected by an intake air flow amount detection device. On the basis of this phenomenon, the fault determination device according to this aspect is able to determine the presence/absence of an abnormality of the negative pressure generation device even in the case where change in the intake air flow amount cannot be detected by the intake air flow amount detection device, and is also capable of determining the presence/absence of an abnormality of the negative pressure generation device without being affected by a factor of false determination ascribable to the intake air flow amount detection device.

In this aspect, when an inflow port provided in the ejector is in communication with an intake passage that is a portion of the intake passageway of the intake system, and that is at an upstream side of an intake air flow amount detection device for detecting a flow amount of intake air, the presence/absence-of-abnormality determination portion may determine the presence of the abnormality, including provisionally determining the presence of the abnormality, if a magnitude of a degree of variation of the rotation speed of the internal combustion engine in accordance with the change in the state of operation of the operation state change device is smaller than a first predetermined value. In the aforementioned case, if the negative pressure generation device is normal, the rotation speed of the internal combustion engine varies in accordance with changes in the state of operation of the operation state change device, and if a channel clogging occurs, the magnitude of the degree of variation of the rotation speed becomes smaller. Therefore, in such a case, the presence/absence of an abnormality of the negative pressure generation device may be determined, for example, in such a manner as in this aspect.

Furthermore, in this aspect, an idle flow amount adjustment device for adjusting an intake air flow amount so as to restrain a variation of an idle rotation speed of the internal combustion engine and keep the idle rotation speed substantially constant may be subjected to an ISC control, and when an increasing/decreasing correction of the intake air flow amount in accordance with the change in the state of operation of the operation state change device is performed by the ISC control, the presence/absence-of-abnormality determination portion may determine the presence of the abnormality, including provisionally determining the presence of the abnormality, if a magnitude of a degree of variation of the rotation speed of the internal combustion engine in accordance with the change in the state of operation of the operation state change device is greater than a second predetermined value. In the case where the increasing/decreasing correction of the intake air flow amount is performed by the ISC control in accordance with changes in the state of operation of the operation state change device so as to restrain variation of the rotation speed of the internal combustion engine, the normal state is a state where the rotation speed of the internal combustion engine undergoes substantially no change in accordance with changes in the state of operation of the operation state change device. Therefore, in such case, the presence/absence of an abnormality of the negative pressure generation device may be determined, for example, in such a manner as in this aspect.

The presence/absence-of-abnormality determination portion may determine that there is a provisional abnormality, instead of determining that there is an abnormality. In this manner, concretely, for example, when the number of times of performance of determination of the presence of an abnormality of the negative pressure generation device exceeds a predetermined number of times, the presence/absence-of-abnormality determination portion may determine that there is a provisional abnormality, and may determine that there is an abnormality only after the number of times that the provisional abnormality determination has been made exceeds a predetermined number of times. Therefore, in the case where it is conceivable that performing the abnormality determination only once may result in a false determination, the aforementioned fashion of determination can enhance the accuracy in determining the presence/absence of an abnormality.

Furthermore, in this aspect, the fault determination device may further include a feedback control prohibition portion that prohibits a feedback control related to the ISC control in accordance with the change in the state of operation of the operation state change device when the presence/absence-of-abnormality determination portion performs the determination. Generally, in the ISC control, the feedback control (hereinafter, also referred to simply as "F/B control") of controlling an idle flow amount adjustment device so as to restrain variation of the idle rotation speed of the internal combustion engine. However, if the F/B control is performed when the determination is to be performed, the rotation speed that has changed due to a state of presence of an abnormality is corrected by the F/B control so as to converge the rotation speed to a target rotation speed. Therefore, if the F/B control is performed when the determination is to be performed, it becomes difficult to stably detect the rotation speed that has changed, giving rise to a possibility of false determination. However, in this aspect, by prohibiting the F/B control, false determination ascribable to the F/B control can be prevented.

Furthermore, in this aspect, the fault determination device may further include a learning control prohibition portion that prohibits a learning control related to the ISC control in accordance with the change in the state of operation of the operation state change device when the presence/absence-of-abnormality determination portion performs the determination. Generally, in the ISC control, on the basis of results of the F/B control, a learning control of the idle flow amount adjustment device so as to keep the idle rotation speed at the target rotation speed is performed. However, if the learning control is performed when the determination is to be performed, there may sometimes occur an undesired event that due to the learning of a transitional change in the intake air flow amount, the learning control does not properly function as is originally intended. In this case, as a result of the learning control, the state of the idle flow amount adjustment device at the time of performing the determination differs, and therefore there is a possibility of decline of the determination accuracy due to differences in the state. Furthermore, while the F/B control is prohibited, it can be said that there is no need to perform the learning control while the F/B control is prohibited. However, in this aspect, by prohibiting the learning control, it is possible to prevent a false determination caused by the learning control.

In this aspect, the fault determination device may further include an abnormality cause determination portion that determines, if the presence/absence-of-abnormality determination portion determines the presence of the abnormality, a cause of the abnormality based on at least one learned value of a learned value related to an air-fuel ratio control of the internal combustion engine and a learned value related to the idle speed control. The causes of abnormality of the negative pressure generation device include not only the channel clogging but also the suction of atmospheric air, the channel being fixed in the open state due to an operation failure of the operation state change device, etc. For example, if the suction of atmospheric air is occurring, the air-fuel ratio becomes considerably lean, the effect of which is reflected in the learned value of the air-fuel ratio related to the fuel injection control. Furthermore, if the operation state change device has an operation failure and therefore the channel is fixed in the open state, the intake air flow amount becomes greater than the intake air flow amount needed in order to maintain the target rotation speed, the effect of which is reflected in the learned value related to the ISC control. According to this aspect with attention focused on this phenomenon, it is possible to determine not only the presence/absence of an abnormality but also a cause of the abnormality if it is present.

In this aspect, the abnormality cause determination portion may determine a state of correction of a fuel injection control based on the learned value of the air-fuel ratio related to the fuel injection control, and if the abnormality cause determination portion determines that the state of correction of the fuel injection control is a state of correcting the air-fuel ratio extensively toward a rich side, the abnormality cause determination portion may determine that the cause of the abnormality is that suction of an atmospheric air is occurring in the negative pressure generation device. Concretely, for example, by determining whether or not the state of correction is the state of correcting the air-fuel ratio extensively toward the rich side as in this aspect, it is possible to determine that occurrence of the suction of the atmospheric air in the negative pressure generation device is a cause of the abnormality. Further concretely, for example, it is possible to adopt a construction in which it is determined whether or not the learned value of the air-fuel ratio is greater than a third predetermined value, and if an affirmative determination is made, it is determined that the state of correction is the state of correcting the air-fuel ratio extensively toward the rich side.

Furthermore in this aspect, the abnormality cause determination portion may determine a state of correction of the intake air flow amount based on the learned value related to the ISC control, and if the abnormality cause determination portion determines that the intake air flow amount is being learned and corrected so that the intake air flow amount decreases, the abnormality cause determination portion may determine that the cause of the abnormality is that the operation state change device has an operation failure and therefore has a channel open. More concretely, for example, by determining whether or not the intake air flow amount is being learned and corrected so that the intake air flow amount decreases, it can be determined that the cause of the abnormality is that the operation state change device has an operation failure and therefore has the channel open. More concretely, for example, it is possible to adopt a construction in which it is determined whether or not the learned value related to the ISC control is smaller than a fourth predetermined value, and if an affirmative determination is made, it is determined that the intake air flow amount is learned and corrected so that the intake air flow amount decreases.

Furthermore in this aspect, if the fuel injection control is not in a state of correcting the air-fuel ratio extensively toward a rich side and the intake air flow amount is not being learned and corrected so that the intake air flow amount decreases, the abnormality cause determination portion determines that the cause of the abnormality is that a channel is clogged in the negative pressure generation device. Concretely, for example, as in this aspect, it is possible to determine that the cause of the abnormality is that the channel clogging is occurring in the negative pressure generation device if the cause of the abnormality is neither that the suction of the atmospheric air is occurring in the negative pressure generation device nor that the operation state change device has an operation failure and therefore has the channel open. Incidentally, the clogging of the negative pressure generation device includes not only the clogging of an internal channel of the ejector itself but also the channel clogging of the bypass, the check valve having an operation failure and therefore closing the channel, etc., and also includes the operation state change device having an operation failure and therefore closing the channel. Furthermore, more concretely, for example, it is also possible to adopt a construction in which it is determined whether or not the learned value of the air-fuel ratio is greater than a third predetermined value, and it is determined whether or not the learned value related to the ISC control is smaller than a fourth predetermined value, and if a negative determination is made in both the determination processes, it is determined that the cause of the abnormality is that the clogging of a channel is occurring in the negative pressure generation device.

According to the invention, it is possible to provide a fault determination device of a negative pressure generation device capable of suitably determining the presence/absence of an abnormality of the negative pressure generation device and also capable of determining a cause of the abnormality.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Best modes of carrying out the invention will be described in detail hereinafter with reference to the drawings.

Figure 1:
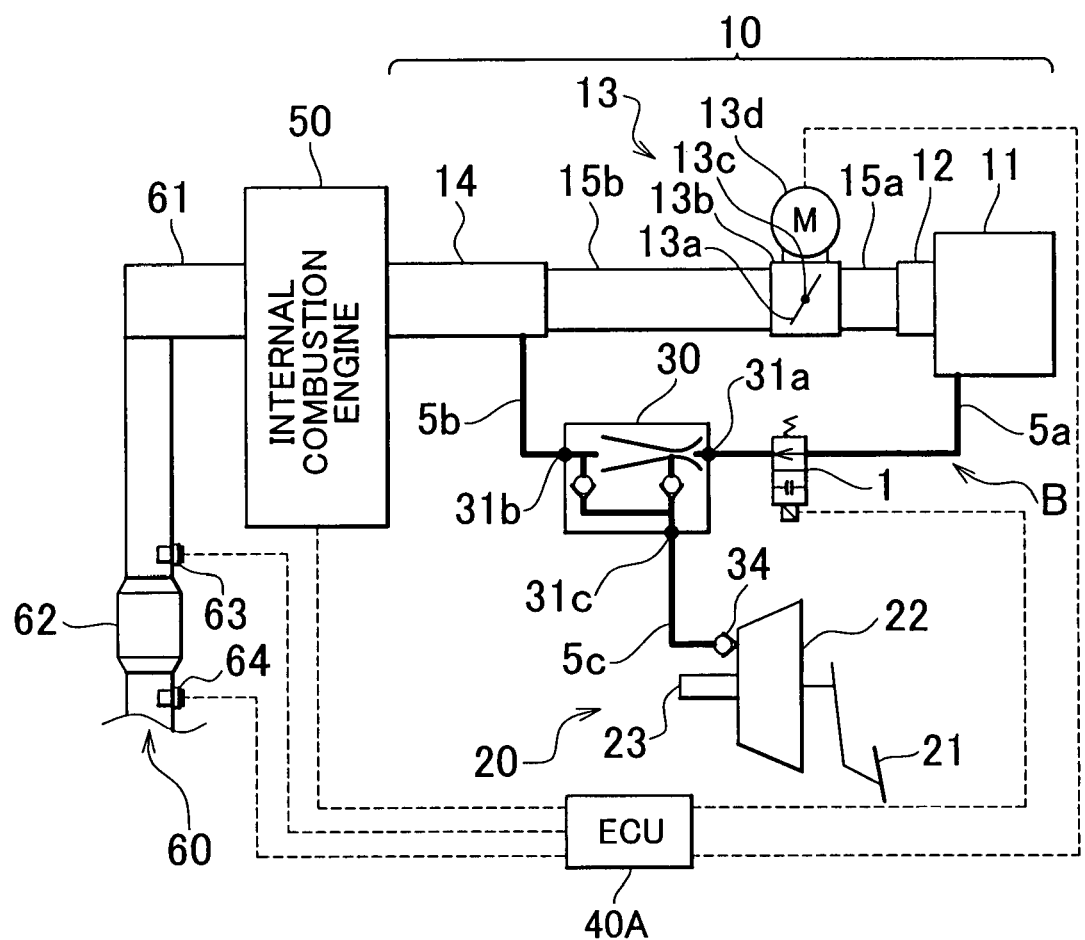
FIG. 1 is a schematic diagram showing an ECU 40A together with a negative pressure generation device 100.

FIG. 1 is a schematic diagram showing a control device of a negative pressure generation device in accordance with a first embodiment that is realized by using an ECU (Electronic Control Unit or electronic control device) 40A, together with a negative pressure generation device 100. Various constructions shown in FIG. 1, including an internal combustion engine 50, are mounted in a vehicle (not shown). An intake system 10 of the internal combustion engine 50 has an air cleaner 11, an air flow meter 12, an electric throttle 13, an intake manifold 14, intake ports (not shown) communicating with cylinders (not shown) of the internal combustion engine 50, components, for example, intake pipes 15a, 15b and the like, which are disposed as appropriate between the foregoing components or parts, etc. The air cleaner 11 is a component provided for filtering intake air that is to be supplied to the cylinders of the internal combustion engine 50, and communicates with the atmosphere via an air duct (not shown). The air flow meter 12 is a component provided for measuring the amount of flow of intake air, and outputs a signal corresponding to the intake air flow amount.

The electric throttle 13 has a throttle valve 13a, a throttle body 13b, a valve shaft 13c, and an electric motor 13d. The throttle valve 13a is a component provided for adjusting the total intake air flow amount supplied to the cylinders of the internal combustion engine 50 by changing its degree of opening. The throttle body 13b is a component made of a tubular member through which an intake passageway is formed. The throttle body 13b supports the valve shaft 13c of the throttle valve 13a that is disposed in the intake passageway. The electric motor 13d is a component provided for changing the opening degree of the throttle valve 13a under the control of the ECU 40. The electric motor 13d is a stepping motor. The electric motor 13d is fixed to the throttle body 13b, and an output shaft (not shown) of the electric motor 13d is linked to the valve shaft 13c. The opening degree of the throttle valve 13a is detected by the ECU 40A on the basis of the output signals of an encoder (not shown) that is provided within the electric throttle 13 (hereinafter, referred to simply as "encoder").

As for the throttle mechanism, it is permissible to apply a throttle-by-wire system as in the electric throttle 13 in which the throttle valve 13a is driven by an actuator. However, this is not restrictive. For example, the electric throttle 13 may be replaced by a mechanical throttle mechanism that is linked to an accelerator pedal (not shown) via a linking cable or the like so that the opening degree of the throttle valve 13a is changed in cooperation with the accelerator pedal. The intake manifold 14 is a component provided for dividing a intake passageway forming a single path on the upstream side into branches on the downstream side corresponding to the cylinders of the internal combustion engine 50 and thus distributing intake air to the cylinders of the internal combustion engine 50.

The brake device 20 has a brake pedal 21, a brake booster 22, a master cylinder 23, and wheel cylinders (not shown). The brake pedal 21 that a driver operates in order to brake rotation of the wheels is linked to an input rod (not shown) of the brake booster 22. The brake booster 22 is a component provided for generating assist force at a predetermined boost ratio to the pedal depression force. A negative pressure chamber (not shown) partitioned at the master cylinder 23 side within the brake booster 22 is connected to the intake passageway of the intake manifold 14 via an ejector 30. An output rod (not shown) of the brake booster 22 is linked to an input shaft (not shown) of the master cylinder 23. The master cylinder 23 generates hydraulic pressure in accordance with the acting force from the brake booster 22, which obtains an assist force in addition to the pedal depression force. The master cylinder 23 is connected to each of wheel cylinders provided in brake mechanisms (not shown) of the wheels via a hydraulic circuit. Each wheel cylinder generates brake force from the hydraulic pressure supplied from the master cylinder 23. The brake booster 22 is not particularly limited but may be a generally employed type as long as it is of a pneumatic type.

The ejector 30 is a component provided for generating a negative pressure that is even greater than the negative pressure that is to be extracted from the intake system 10 and, more concretely, the intake manifold 14, and for supplying the negative pressure to the negative pressure chamber of the brake booster 22. The ejector 30 has an inflow port 31a, an outflow port 31b, and a negative pressure supply port 31c. Among these, the negative pressure supply port 31c is connected to the negative pressure chamber of the brake booster 22 via an air hose 5c. Furthermore, the inflow port 31a is connected to the intake passageway within the air cleaner 11 by an air hose 5a, and the outflow port 31b is connected to the intake passageway of the intake manifold 14 by an air hose 5b and the electric throttle 13, so that the inflow port 31a and the outflow port 31b are connected to the intake passageway astride the electric throttle 13, more concretely, the throttle valve 13a. Thus, a bypass B bypassing the air flow meter 12 the electric throttle 13 is formed by the air hoses 5a, 5b, including the ejector 30. When the ejector 30 is not functioning, the negative pressure chamber of the brake booster 22 is supplied with negative pressure from the intake passageway of the intake manifold 14 via the air hose 5b, the outflow port 31b of the ejector 30, the negative pressure supply port 31c, and an air hose 5c.

The air hose 5a is provided with a VSV (vacuum switching valve) 1. The VSV 1 is a component for opening and closing the bypass B under the control of the ECU 40A. In this embodiment, the VSV 1 is a normally closed 2-position-2-port solenoid valve. However, this is not restrictive, and the VSV 1 may be another suitable type of valve, for example, an electromagnetic valve or the like. Furthermore, the VSV 1 may also be a flow amount adjustment valve capable of controlling the degree of closure of the channel, or the like. Furthermore, the VSV 1 is a component provided for causing the ejector 30 to function or stop functioning by opening or closing the bypass B. In this embodiment, the VSV 1 may realize a state change device.

Figure 2:
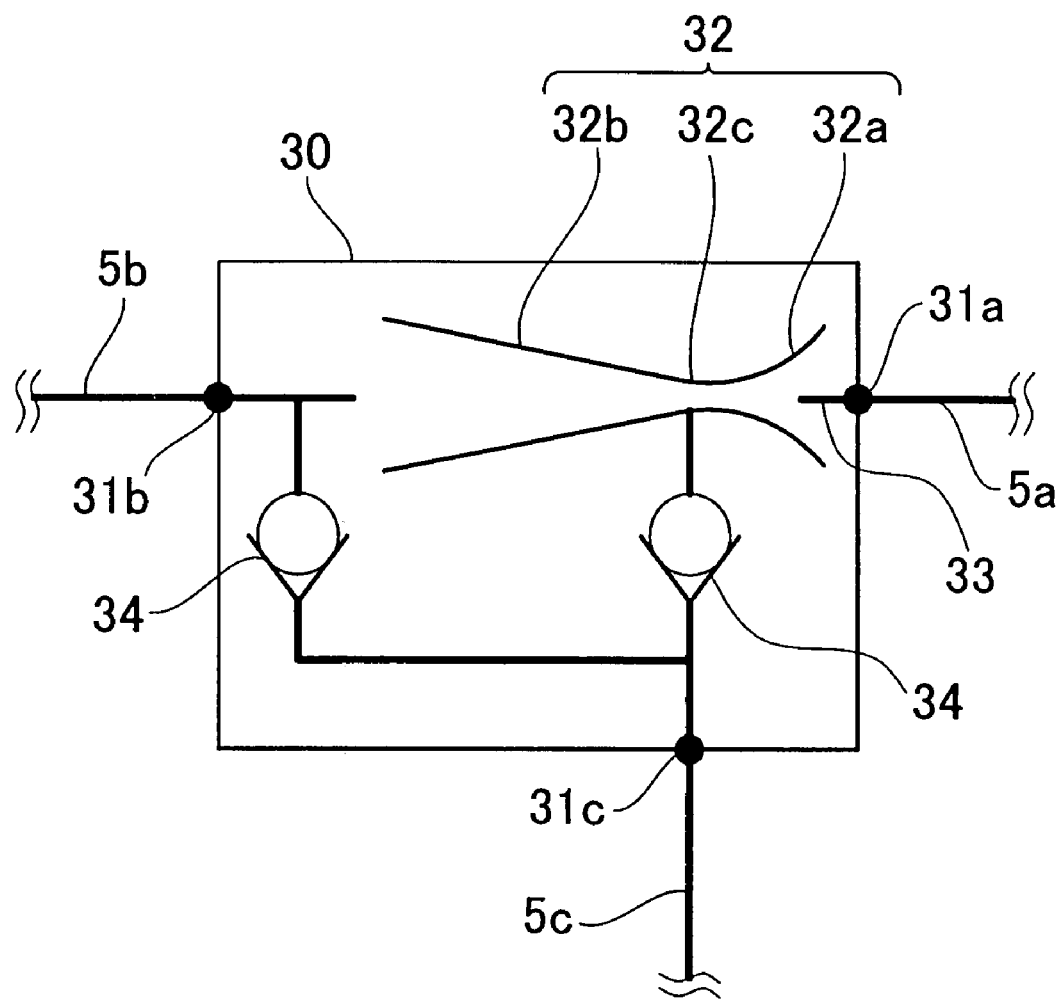
FIG. 2 is a schematic diagram showing an internal construction of an ejector 30.

FIG. 2 is a schematic diagram showing an internal construction of the ejector 30. The ejector 30 has a diffuser 32 therein. The diffuser 32 is constructed of a convergent portion 32a, a divergent portion 32b, and a negative pressure extraction portion 32c that is a passageway connecting the convergent portion 32a and the divergent portion 32b in communication. The convergent portion 32a has an opening that faces the inflow port 31a, and the divergent portion 32b has an opening that faces the outflow port 31b. The negative pressure extraction portion 32c communicates with the negative pressure supply port 31c. The inflow port 31a is provided with a nozzle 33 that jets the intake air that has flown in, to the convergent portion 32a. The intake air jetted from the nozzle 33 flows through the diffuser 32, and then flows out of the outflow port 31b into the air hose 5b. At this time, a high-speed jet flow is caused in the diffuser 32, so that due to the Venturi effect, a great negative pressure occurs in the negative pressure extraction portion 32c. This negative pressure is supplied from the negative pressure supply port 31c to the negative pressure chamber via the air hose 5c. Due to this function of the ejector 30, the brake booster 22 can obtain a negative pressure that is greater than the negative pressure that is extracted from the intake manifold 14. Check valves 34 provided in an internal channel between the negative pressure extraction portion 32c and the negative pressure supply port 31c, an internal channel between the outflow port 31b and the negative pressure supply port 31c, and a connecting portion of the brake booster 22 to the air hose 5c shown in FIG. 1 are valves for preventing reverse flow. The ejector 30 is not limited to an ejector that has an internal construction as shown in FIG. 2, but may also be replaced by an ejector that has a different internal construction. In this embodiment, the VSV 1 and the ejector 30 may realize the negative pressure generation device 100; more concretely, the negative pressure generation device 100 may have the air hoses 5a, 5b that form the bypass B, the air hose 5c connecting the brake booster 22 and the ejector 30, and the check valve 34.

Referring back to FIG. 1, the internal combustion engine 50 includes fuel injection valves (not shown). Each fuel injection valve is opened at an appropriate injection timing, and is closed after the elapse of an appropriate injection duration. Each fuel injection valve is supplied with fuel from a fuel pump (not shown), and the fuel pump pressurizes fuel to an appropriate fuel injection pressure under the control of the ECU 40A. In this manner, each fuel injection valve injects an appropriate amount of fuel at an appropriate timing. The arrangement of the fuel injection valves is not particularly limited. For example, each fuel injection may be disposed so as to directly inject fuel into the corresponding cylinder, or may also be disposed so as to inject fuel into the corresponding intake port. Furthermore, the internal combustion engine 50 may include both a fuel injection valve for injecting fuel directly into the cylinder and a fuel injection valve for injecting fuel into the intake port.

An exhaust system 60 has an exhaust manifold 61, a three-way catalyst 62, a muffler (not shown) and exhaust pipes disposed as appropriate between these components or parts, etc. The exhaust manifold 61 is a component provided for joining exhaust from the cylinders. The exhaust manifold 61 joins the exhaust passageways divided corresponding to the cylinders into a single exhaust passageway on the downstream side. The three-way catalyst 62 is a component provided for purifying exhaust gas. The three-way catalyst 62 accomplishes the oxidation of hydrocarbon HC and carbon monoxide CO and the reduction of nitrogen oxides NOx. In the exhaust system 60, an A/F sensor 63 for linearly detecting the air-fuel ratio on the basis of the oxygen concentration in exhaust gas is disposed upstream of the three-way catalyst 62, and an oxygen sensor 64 for detecting whether the air-fuel ratio is on the rich or lean side of a stoichiometric air fuel ratio on the basis of the oxygen concentration in exhaust gas is disposed downstream of the three-way catalyst 62.

The ECU 40A has a CPU (Central Processing Unit), a ROM (Read-Only Memory), a RAM (Random Access Memory), an input/output circuit, etc. The ECU 40A is mainly a component provided for controlling the internal combustion engine 50, and in this embodiment controls the electric throttle 13 and the VSV 1 as well. Besides the VSV 1, the fuel injection valves and the electric throttle 13, various other control objects are connected to the ECU 40A via drive circuits (not shown). Furthermore, various sensors, including an encoder, an accelerator sensor (not shown) for detecting the state of the accelerator pedal, a crank angle sensor (not shown) for detecting the rotation speed Ne of the internal combustion engine 50, a water temperature sensor (not shown) for detecting the water temperature thw of the internal combustion engine 50, a vehicle speed sensor (not shown) for detecting the vehicle speed spd, the A/F sensor 63, the oxygen sensor 64, etc., are connected to the ECU 40A.

The ROM is a component provided for storing programs that describe the various processes that are executed by the CPU. In this embodiment, an internal combustion engine 50 control-purpose program, including a fuel injection control, is stored. In the fuel injection control, the air-fuel ratio is detected on the basis of output signals of the A/F sensor 63 and the oxygen sensor 64, and the learning of the air-fuel ratio for bringing the air-fuel ratio to a target air-fuel ratio is also performed. Generally, the learning of the air-fuel ratio is started as the warmup of the internal combustion engine 50 is completed. In the learning of the air-fuel ratio, the maximum intake air flow amount is learned in a plurality of divided learning regions (e.g., five regions of an idle operation region, a low intake air flow amount region, a low-to-intermediate intake air flow amount region, an intermediate-to-high intake air flow amount region, a high intake air flow amount region). In each learning region, the target air-fuel ratio and the air-fuel ratio detected during a state where the state of operation of the internal combustion engine 50 is stable, and the differences therebetween is set as a learned value of the air-fuel ratio.

The learned value of the air-fuel ratio is normally a value within a range that requires a fuel correction of about ±5%. However, for example, when the negative pressure generation device 100 is sucking atmospheric air or the like, the learned value of the air-fuel ratio can become a value that requires a rich correction of the air-fuel ratio to a considerable extent (e.g., +30%). Therefore, by determining whether or not the state of correction of the fuel injection control is a state of an extensively rich correction of the air-fuel ratio on the basis of the learned value of the air-fuel ratio, it is possible to determine whether or not the suction of atmospheric air is occurring. The learning of the air-fuel ratio is completed when the parameter of the mean value reaches a predetermined number.

Besides the program for controlling the internal combustion engine 50, the ROM also stores a VSV 1 control-purpose program for controlling the VSV 1 (hereinafter, also referred to simply as "opening or closing the VSV 1") so as to cause the ejector 30 to function or stop functioning under various conditions, a presence/absence-of-abnormality determination-purpose program for determining the presence/absence of an abnormality of the negative pressure generation device 100 on the basis of variation of the rotation speed Ne corresponding to change in the state of operation of the VSV 1, etc. These programs may be integrally combined. In this embodiment, the VSV 1 control-purpose program further includes an abnormality determination mode-purpose program for controlling the VSV 1 so as to cause the ejector 30 to function or stop functioning under a predetermined condition at the time of determining the presence/absence of an abnormality of the negative pressure generation device 100.

Concretely in this embodiment, the presence/absence-of-abnormality determination-purpose program is programmed so as to determine whether or not the magnitude of the degree of variation of the rotation speed Ne (hereinafter, also referred to simply as "degree of variation $\Delta N$") corresponding to change in the state of operation of the VSV 1 (furthermore, change in the state of operation of the VSV 1 at the time of opening the VSV 1 in this embodiment) is smaller than a first predetermined value $\alpha 1$. Furthermore, in this embodiment, the presence/absence-of-abnormality determination-purpose program is programmed so the presence/absence of an abnormality is determined only after a provisional determination is made a plurality of times. Concretely, the presence/absence-of-abnormality determination-purpose program is programmed so that it is provisionally determined whether or not the degree of variation $\Delta N$ is smaller than the first predetermined value $\alpha 1$, and so that if an affirmative determination is made, it is considered that a provisional determination that there is an abnormality is made once, and the number of times that a provisional abnormality determination has been made is incremented by 1.

Furthermore, the program is programmed so as to determine that there is an abnormality only if the number of times that a provisional abnormality determination has been made is greater than a predetermined number of times n2 when the number of times that the provisional determination has been performed becomes greater than a predetermined number of times n1 that is greater one. Thus, where it is conceivable that performing the determination only once may result in a false determination, determining the presence/absence of an abnormality only after performing the provisional determination a plurality of times can improve the determination accuracy. However, this is not restrictive. It may also be determined that there is an abnormality by performing the determination only once. In this embodiment, the CPU, the ROM and the RAM (hereinafter, also referred to simply as "the CPU and the like") as well as the aforementioned various programs may realize various control portions, detection portions, determination portions, etc. In particular, the CPU and the like, and the presence/absence-of-abnormality determination-purpose program may realize a presence/absence-of-abnormality determination portion. In this embodiment, the ECU 40A may realize a fault determination device of the negative pressure generation device.

Figure 3A:
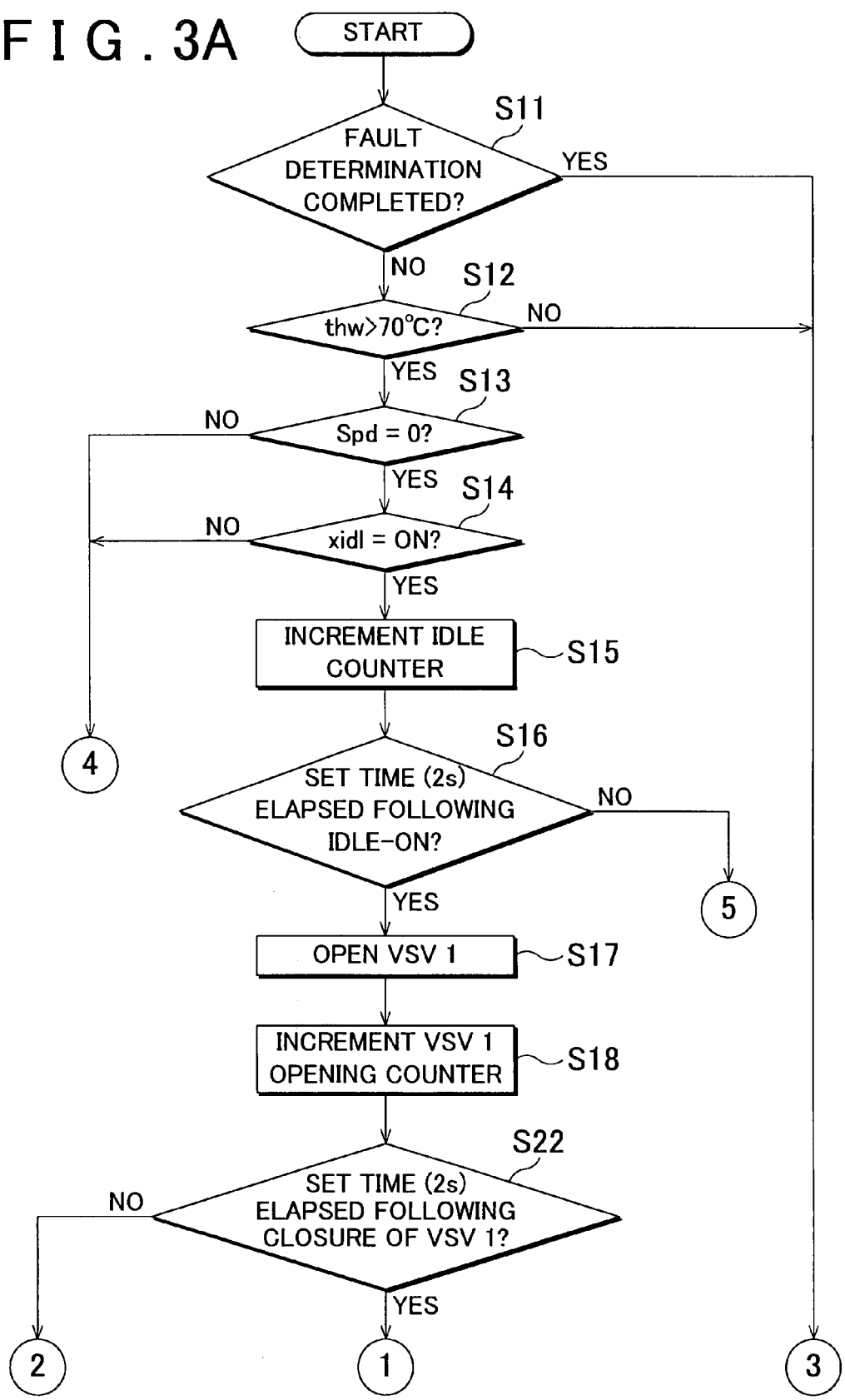
FIGS. 3A and 3B are diagram showing processes executed by the ECU 40A in the form of flowchart.
Figure 3B:
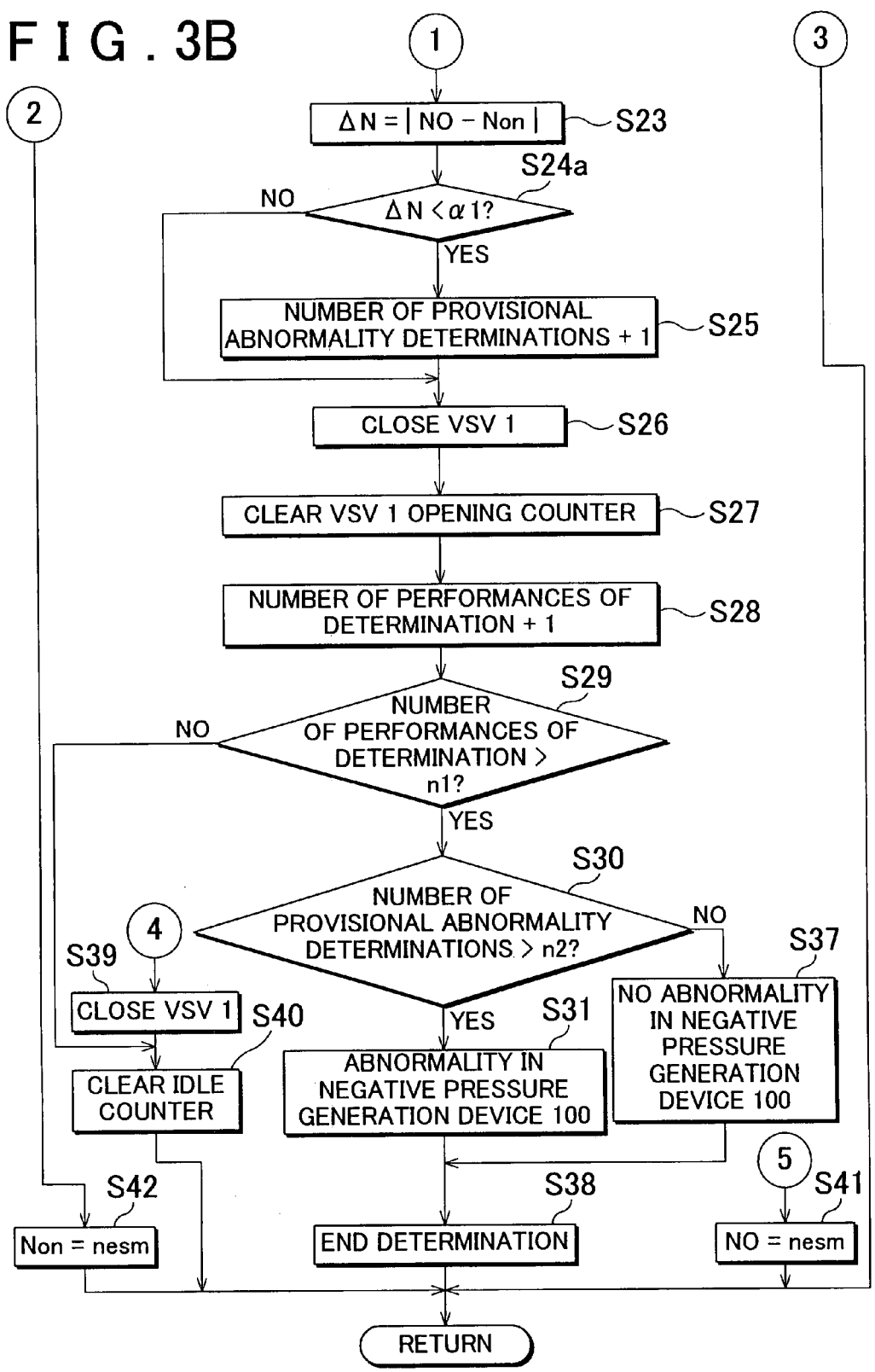

Next, a process performed by the ECU 40A to determine the presence/absence of an abnormality of the negative pressure generation device 100 will be described with reference to a flowchart shown in FIGS. 3A and 3B. The ECU 40A determines whether or not there is a fault in the negative pressure generation device 100 by the CPU repeatedly executing the process shown by the flowchart in a very short time on the basis of various programs as mentioned above which are stored in the ROM. The flowchart in FIGS. 3A and 3B shows a series of processes in a conveniently divided fashion. The CPU executes a process of determining whether or not the fault determination is completed (step 11). In this step, the CPU determines whether or not the determination is already completed on the basis of a below-described process shown in step 38 after the ignition SW has been turned on. If an affirmative determination is made in step 11, there is no need to proceed to the determination, and therefore the CPU executes the process of step 11 again. On the other hand, if a negative determination is made in step 11, the CPU executes a process of determining whether or not the water temperature thw is higher than 70° C. (step 12). The water temperature thw can be detected, for example, on the basis of the output signal of the water temperature sensor. In this step, it is determined whether or not the warmup of the internal combustion engine 50 has been completed. If a negative determination is made in this step, the CPU repeatedly executes the process shown in steps 11 and 12 until an affirmative determination is made in step 12. Thus, the fault determination is not performed until the warmup is completed.

On the other hand, if an affirmative determination is made in step 12, the CPU executes a process of determining whether or not the vehicle speed spd is 0 (zero) (step 13). The vehicle speed spd can be detected, for example, on the basis of the output signal of the vehicle speed sensor. If a negative determination is made in this step, the CPU executes a process for closing the VSV 1 in step 39, and then executes a process of clearing an idle counter in step 40. In step 39, the CPU executes a process for closing the VSV 1 in order to improve the fuel economy performance of the internal combustion engine 50 after the completion of the warmup. In step 40, the CPU executes a process of clearing the idle counter that indicates whether or not the state of operation of the internal combustion engine 50 is an idling state, since the internal combustion engine 50 is not in the idling state. On the other hand, if an affirmative determination is made in step 13, the CPU executes a process of determining whether or not the internal combustion engine 50 is in the idling state (whether or not the idle xidl is on) (step 14). It is possible to determine whether or not the idle xidl is on, for example, on the basis of an output signal of an accelerator sensor, or an output signal of an idle sensor that detects in an on-off manner whether or not the accelerator pedal is in a depressed state, etc.

If a negative determination is made in step 14, the CPU executes the processes shown in steps 39 and 40 as in the case where a negative determination is made in step 13. Incidentally, if the VSV 1 has already been closed and the idle counter has already been cleared, these steps may be skipped. If an affirmative determination is made in step 14, it is determined that the state of operation of the internal combustion engine 50 is the idling state, and the CPU executes a process of incrementing the idle counter (step 15). Subsequently, the CPU executes a process of determining whether or not a predetermined time (2 seconds in this embodiment) has elapsed since the idle xidl was turned on (step 16). If a negative determination is made in step 16, the CPU executes a process of detecting the engine rotation speed Ne occurring prior to the execution of the process for opening the VSV 1 as a rotation speed nesm on the basis of the output signal of the crank angle sensor and storing the detected rotation speed nesm as a pre-variation rotation speed NO in the RAM (step 41). Then, the CPU repeatedly executes the process shown in step 41 until an affirmative determination is made in step 16. Thus, until the process for opening the VSV 1 is executed, the pre-variation rotation speed NO is updated successively. Thus, the pre-variation rotation speed NO is accurately detected.

If an affirmative determination is made in step 16, the CPU executes the process for opening the VSV 1 (step 17). That is, in this embodiment, a predetermined condition for controlling the VSV 1 so as to cause the ejector 30 to function in the abnormality determination mode-purpose program is satisfied when a negative determination is made in step 11 and an affirmative determination is made in steps 12 to 14 and step 16. However, this is not restrictive. For example, the predetermined condition in conjunction with the abnormality determination mode-purpose program may be an appropriate condition other than the aforementioned condition. Subsequently to step 17, the CPU executes a process of incrementing a VSV 1-opening counter that indicates that the process for opening the VSV 1 has been executed (step 18).

Subsequently, the CPU executes a process of determining whether or not a predetermined time (2 seconds in this embodiment) has elapsed following the execution of the process for opening the VSV 1 (step 22). If a negative determination is made in step 22, the CPU executes a process of detecting the engine rotation speed Ne following the execution of the process for opening the VSV 1 as a rotation speed nesm on the basis of the output signal of the crank angle sensor and storing the detected rotation speed nesm as a post-variation rotation speed Non in the RAM (step 42). Until an affirmative determination is made in step 22, the CPU repeatedly executes the process shown in step 42. Therefore, until the process for closing the VSV 1 is executed, the post-variation rotation speed Non is successively updated, so that the post-variation rotation speed Non can be accurately detected. Subsequently, the CPU executes a process of calculating a degree of variation $\Delta N$ from the absolute value of a difference between the pre-variation rotation speed NO and the post-variation rotation speed Non (step 23).

Furthermore, the CPU executes a process of determining whether or not the degree of variation $\Delta N$ is smaller than a first predetermined value $\alpha 1$ (step 24a). The determination in this step is performed as a provisional determination for determining the presence/absence of an abnormality. If an affirmative determination is made in this step, the CPU executes a process of increasing the number of times that a provisional abnormality determination has been made by 1 (step 25). On the other hand, if a negative determination is made in step 24*a*, the CPU executes a process shown in step 26 without increasing the number of times that a provisional abnormality determination has been made. Subsequently to step 24*a* or 25, the CPU executes a process for closing the VSV 1 (step 26). That is, a predetermined condition for controlling the VSV 1 so as to cause the ejector 30 to stop functioning in an abnormality determination mode-purpose program is satisfied when an affirmative determination has been made in step 22 and the determination process shown in step 24*a* has been executed. However, this is not restrictive. That is, the predetermined condition in conjunction with the abnormality determination mode-purpose program may also be an appropriate condition other than the aforementioned condition.

After executing the process for closing the VSV 1 in step 26, the CPU executes a process of clearing the VSV 1-opening counter (step 27). Subsequently, the CPU executes a process of increasing the number of times of performance of the provisional determination by 1 (step 28). Furthermore, the CPU executes a process of determining whether or not the number of times of performance of the provisional determination is greater than a predetermined number of times n1 (step 29). If a negative determination is made in step 29, the CPU executes the process shown in step 40. Therefore, the provisional determination can be performed until the number of times of performance of the provisional determination exceeds the predetermined number of times n1. On the other hand, if the number of times of determination is greater than the predetermined number of times n1 in step 28, an affirmative determination is made in step 29, and the CPU executes a process of determining whether or not the number of times that a provisional abnormality determination has been made is greater than a predetermined number of times n2 (step 30). This will enhance the accuracy of the determination regarding the presence/absence of an abnormality in the case where performing the determination only once may result in a false determination.

If a negative determination is made in step 30, the CPU determines that there is no abnormality in the negative pressure generation device 100 (step 37), and ends the determination process (step 38). On the other hand, if an affirmative determination is made in step 30, the CPU determines that there is an abnormality in the negative pressure generation device 100 (step 31), and ends the determination process (step 38). Therefore, even where a change in the intake air flow amount cannot be detected by the air flow meter 12, the presence/absence of an abnormality of the negative pressure generation device 100 can be determined. Furthermore, the presence/absence of an abnormality of the negative pressure generation device 100 can be determined without influence of a factor for a false determination ascribable to the air flow meter 12. As can be understood from the foregoing description, it is possible to realize the ECU 40A capable of suitably determining the presence/absence of an abnormality of the negative pressure generation device 100.

Figure 4:
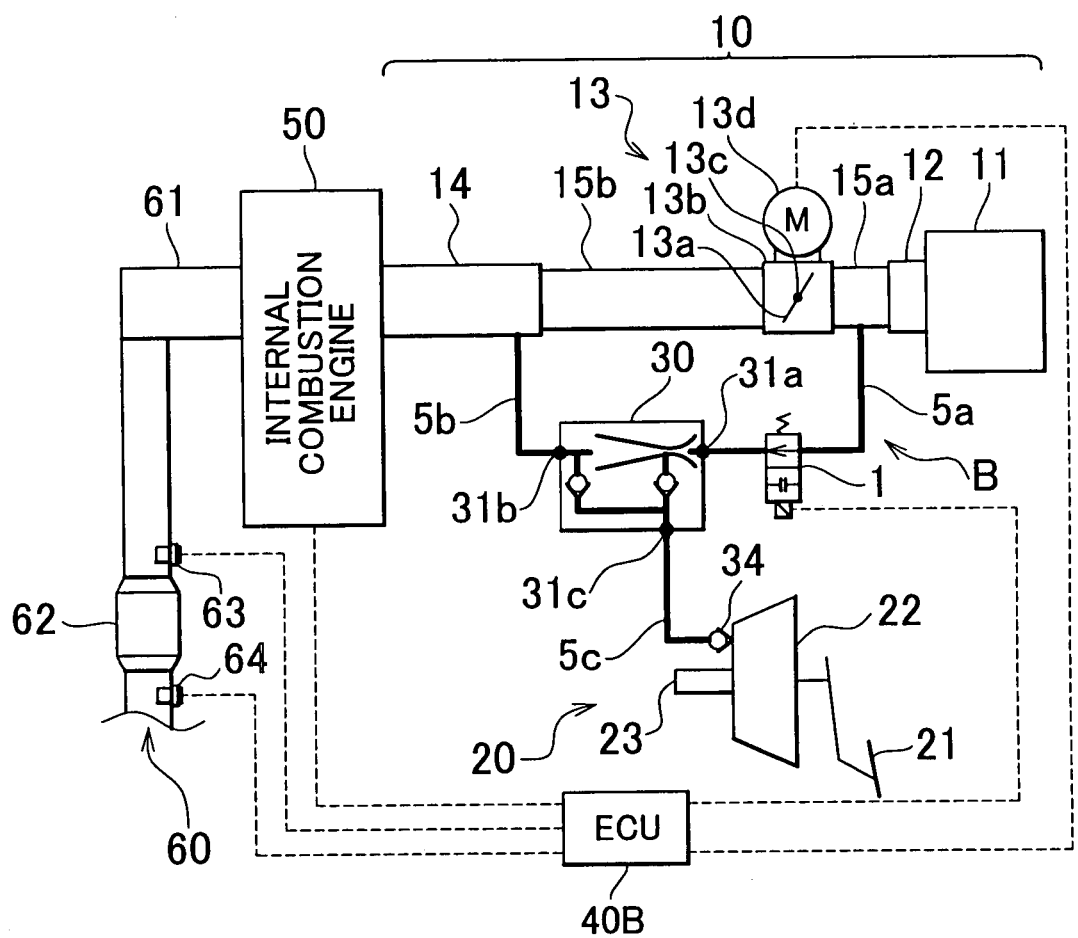
FIG. 4 is a schematic diagram showing an ECU 40B together with the negative pressure generation device 100.

In a second embodiment, while various constructions provided in a vehicle are the same as the constructions except for the ECU 40A shown above in conjunction with the first embodiment, the second embodiment is different from the first embodiment in that, as shown in FIG. 4, an inflow port 31*a* is connected to an intake passageway of an intake pipe 15*a* by an air hose 5*a*, and therefore a bypass B does not bypass an air flow meter 12. An ECU 40B in accordance with the second embodiment is the same as the ECU 40A, except that, in the ECU 40B, a presence/absence-of-abnormality determination-purpose program for determining the presence/absence of an abnormality of a negative pressure generation device 100 on the basis of the variation of the rotation speed Ne corresponding to change in the state of operation of the VSV 1 is programmed as described below, and that an ISC control-purpose program for performing an ISC control of an electric throttle 13 is further provided. These programs may be integrally combined. In relation to this, the electric throttle 13 in this embodiment is provided also as a component for adjusting the intake air flow amount in order to control the idle rotation speed. Thus the electric throttle 13 may realize an idle flow amount adjustment device. However, this is not restrictive. For example, a bypass may be formed with respect to the throttle valve 13*a*, and the bypass may be provided with a so-called ISC valve capable of controlling the degree of closure of the channel, as an idle flow amount adjustment device.

Concretely, the ISC control-purpose program includes an F/B control amount-changing program for changing the F/B control amount on the basis of a difference between the target intake air flow amount and the intake air flow amount based on the output signal of the air flow meter 12 in order to perform the F/B control of the electric throttle 13 so as to restrain the variation of the intake air flow amount, a control amount-learning program for learning a learning control amount (hereinafter, also referred to as "learned value") for performing the learning control of the electric throttle 13 so as to keep the intake air flow amount at a target intake air flow amount on the basis of a result of the F/B control, a correction control amount-increasing/decreasing program for increasing/decreasing the correction control amount for performing the correction control of the electric throttle 13 so as to change the target rotation speed in accordance with the state of operation of the airconditioner, the magnitude of the electric load, etc., an ISC control amount-calculating program for eventually calculating an ISC control amount for controlling the electric throttle 13, from the F/B control amount, the learning control amount and the correction control amount, and an electric throttle control-purpose program for controlling the electric throttle 13 on the basis of the calculated ISC control amount.

In this embodiment, the correction control amount-increasing/decreasing program is programmed so as to increasing or decreasing the correction control amount that is suitable for the intake air flow amount to be increased or decreased in accordance with change in the state of operation of the ejector 30 (hereinafter, also referred to simply as "ejector correction amount"). Concretely, the ejector correction amount is increased or decreased so as to restrain the intake air flow amount from varying in accordance with changes in the state of operation of the ejector 30 in a normal state, and therefore restrains variation of the rotation speed Ne. In this embodiment, the ISC control-purpose program includes a F/B control-prohibiting program for prohibiting the F/B control in accordance with change in the state of operation of the VSV 1 at the time of determining the presence/absence of an abnormality of the negative pressure generation device 100, and a learning control prohibiting program for prohibiting the learning control in accordance with change in the state of operation of the VSV 1.

In this embodiment, concretely, the presence/absence-of-abnormality determination-purpose program is programmed so as to determine whether or not the degree of variation ΔN in accordance with change in the state of operation of the VSV 1 (furthermore in this state, change in the state of operation at the time of opening VSV 1) is greater than a second predetermined value α2. In this embodiment, the presence/absence-of-abnormality determination-purpose program is programmed so as to determine the presence/absence of an abnormality only after the provisional determination has been performed a plurality of times as in the first embodiment. However, this is not restrictive. For example, the presence/absence of an abnormality may also be determined by performing the determination process only once. In this embodiment, the CPU and the like and the presence/absence-of-abnormality determination-purpose program may realize a presence/absence-of-abnormality determination portion, and the CPU and the like and the F/B control-prohibiting program may realize a F/B control prohibition portion, and the CPU and the like and the learning-prohibiting program may realize a learning prohibition portion. In this embodiment, the ECU 40B may realize the fault determination device of the negative pressure generation device.

Figure 5A:
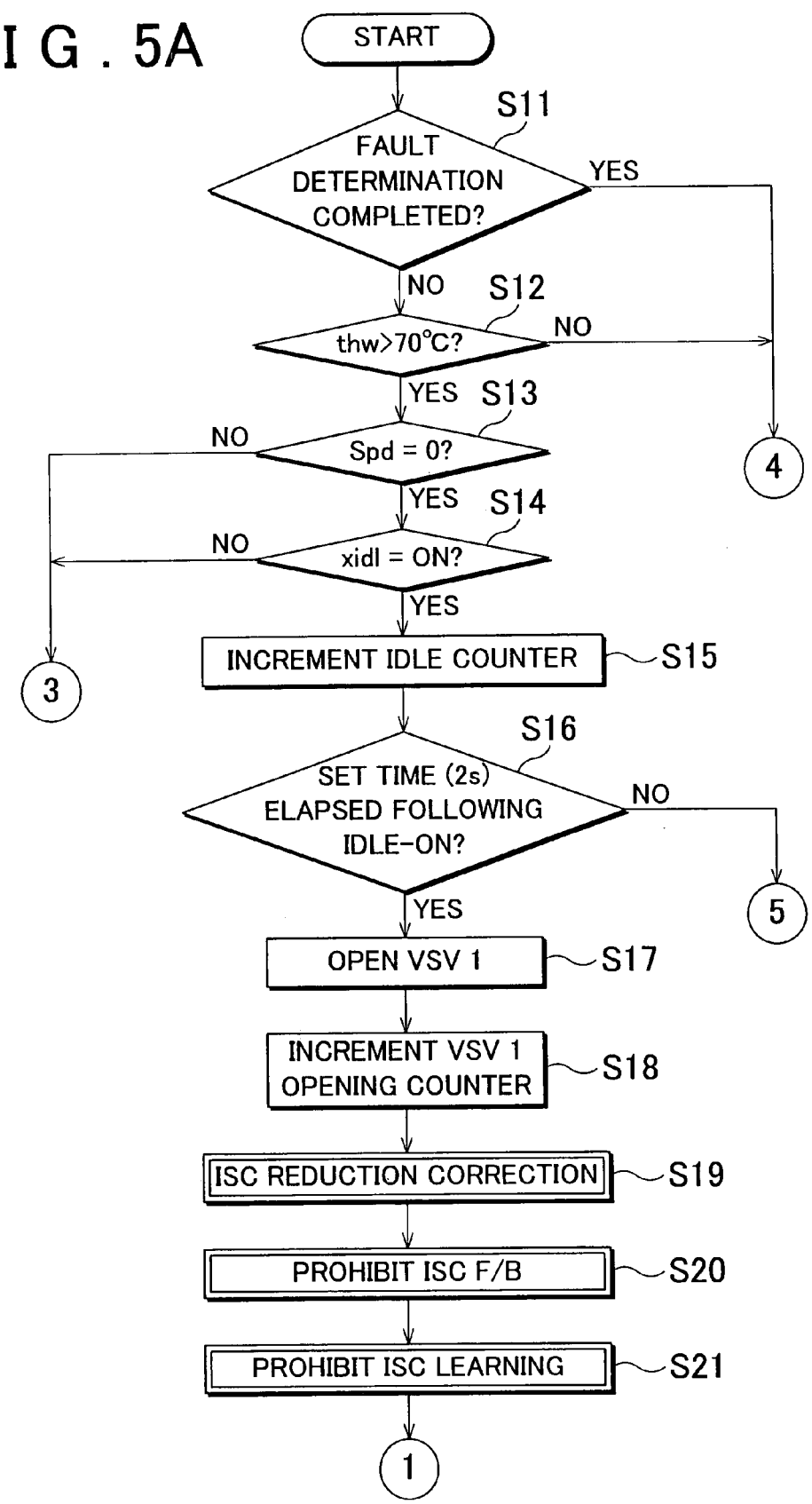
FIGS. 5A, 5B and 5C are diagram showing processes executed by the ECU 40B in the form of flowchart.
Figure 5B:
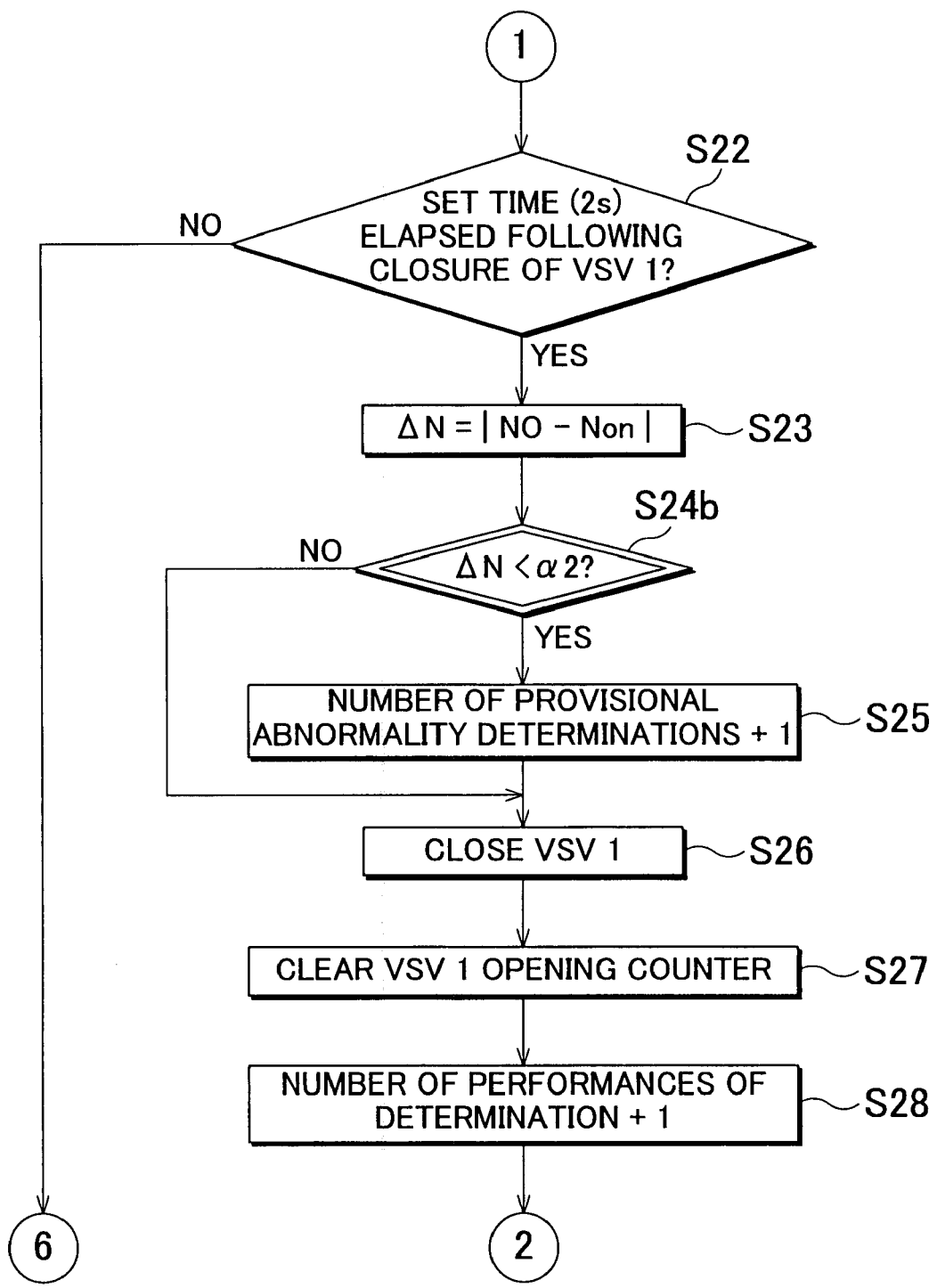
Figure 5C:
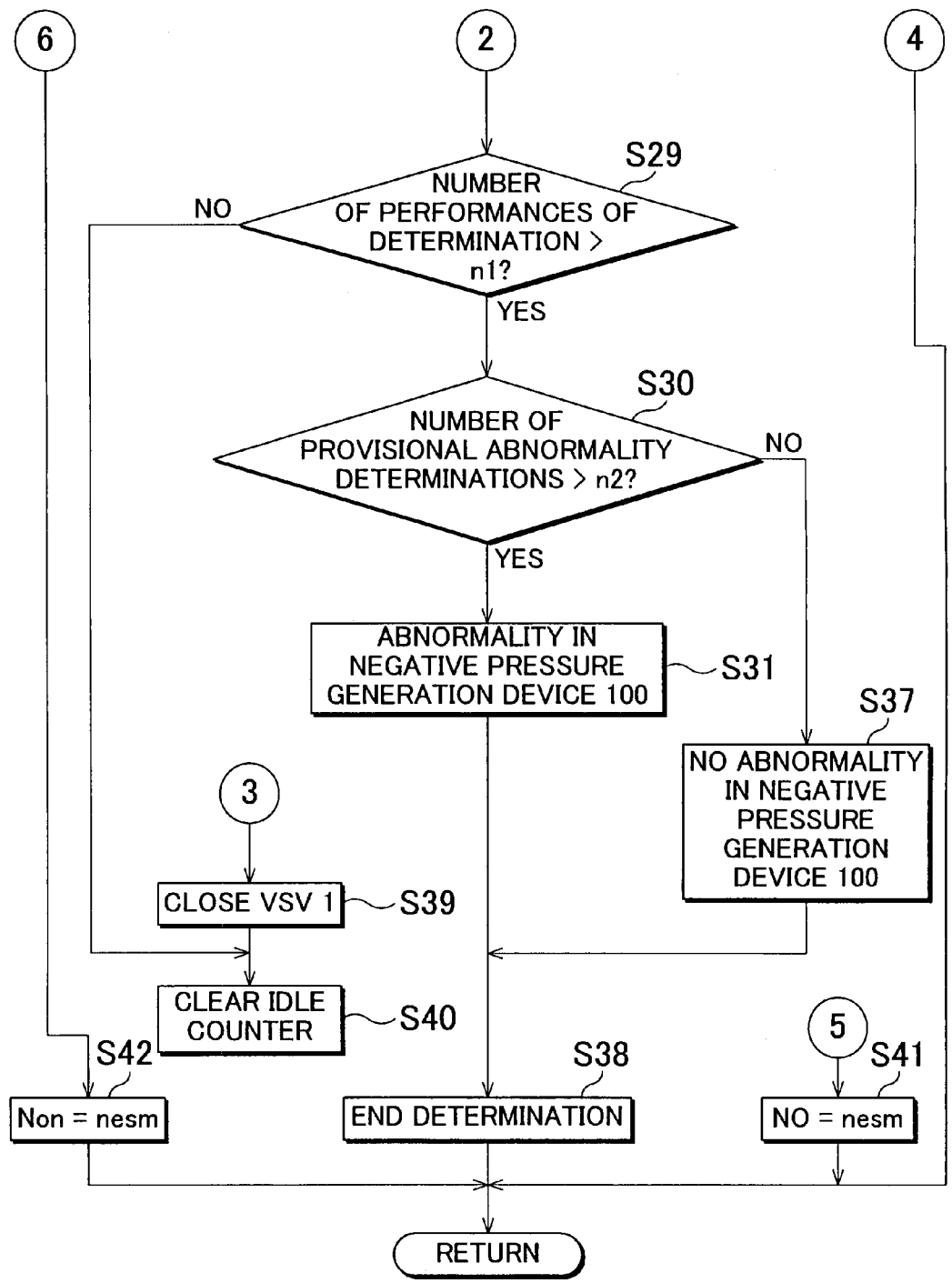

Next, a process executed by the ECU 40B to determine the presence/absence of an abnormality of the negative pressure generation device 100 will be described in detail with reference to the flowchart shown in FIGS. 5A, 5B and 5C. The flowchart in FIGS. 5A, 5B and 5C shows a series of processes in a conveniently divided fashion, and is the same as the flowchart shown in FIGS. 3A and 3B, except that steps 19 to 21 are added, and step 24a is replaced by step 24b. Therefore, in this embodiment, steps 19 to 21 and step 24b will be described in detail below. In step 17, the CPU executes a process for opening the VSV 1. In step 18, the CPU executes a process of incrementing the VSV 1-opening counter. After that, the CPU executes a process of reducing the ISC control amount with an ejector correction amount, and a process of prohibiting the F/B control and the learning control (steps 19 to 21).

Therefore, variation of the engine rotation speed Ne is restrained when the negative pressure generation device 100 is in a normal state, and a false determination regarding the presence/absence of an abnormality arising from the F/B control or the learning control can be prevented. Furthermore, after executing a process of calculating the degree of variation ΔN in step 23, the CPU executes a process of determining whether or not the degree of variation ΔN is greater than the second predetermined value α2 (step 24b). That is, when in the ISC control, the increase/decrease correction of the intake air flow amount in accordance with change in the state of operation of the VSV 1 is performed, the intake air flow amount greatly varies if the negative pressure generation device 100 has an abnormality. Therefore, the presence/absence of an abnormality can be determined. As described above, the ECU 40B capable of suitably determining the presence/absence of an abnormality of the negative pressure generation device 100 can be realized.

Various constructions provided in a vehicle are the same as the constructions except for the ECU 40B shown above in conjunction with the second embodiment, and the manner of connection of the bypass B is also substantially the same as in the second embodiment. The ECU 40C in accordance with the third embodiment is the same as the ECU 40B in accordance with the second embodiment, except that the ECU 40C further includes an abnormality cause determination-purpose program for determining a cause of an abnormality on the basis of the learned value of the air-fuel ratio of the internal combustion engine 50 and the learned value related to the ISC control if the presence of the abnormality is determined on the basis of the presence/absence-of-abnormality determination-purpose program.

Concretely, this abnormality cause determination-purpose program includes a first abnormality cause determination-purpose program for determining, if it is determined that an abnormality is present on the basis of the presence/absence-of-abnormality determination-purpose program, whether or not suction of atmospheric air is a cause of the abnormality depending on whether or not the learned value of the air-fuel ratio is greater than a third predetermined value β, a second abnormality cause determination-purpose program for determining whether or not a cause of the abnormality is the VSV 1 having an operation failure and therefore opening the channel (hereinafter, also referred to simply as "the VSV 1 opening abnormality") depending on whether or not the learned value related to the ISC control is smaller than a fourth predetermined value γ, and a third abnormality cause determination-purpose program for determining whether or not a cause of the abnormality is the negative pressure generation device 100 having the clogging of a channel or the VSV 1 having an operation failure and therefore closing the channel (hereinafter, referred to simply as "the VSV 1 closure abnormality") in the case where the learned value of the air-fuel ratio is less than or equal to the third predetermined value β and the learned value related to the ISC control is greater than or equal to the fourth predetermined value γ. In this embodiment, the CPU and the like and the abnormality cause determination-purpose program may realize an abnormality cause determination portion, and the ECU 40C may realize a fault determination device of a negative pressure generation device.

Figure 6A:
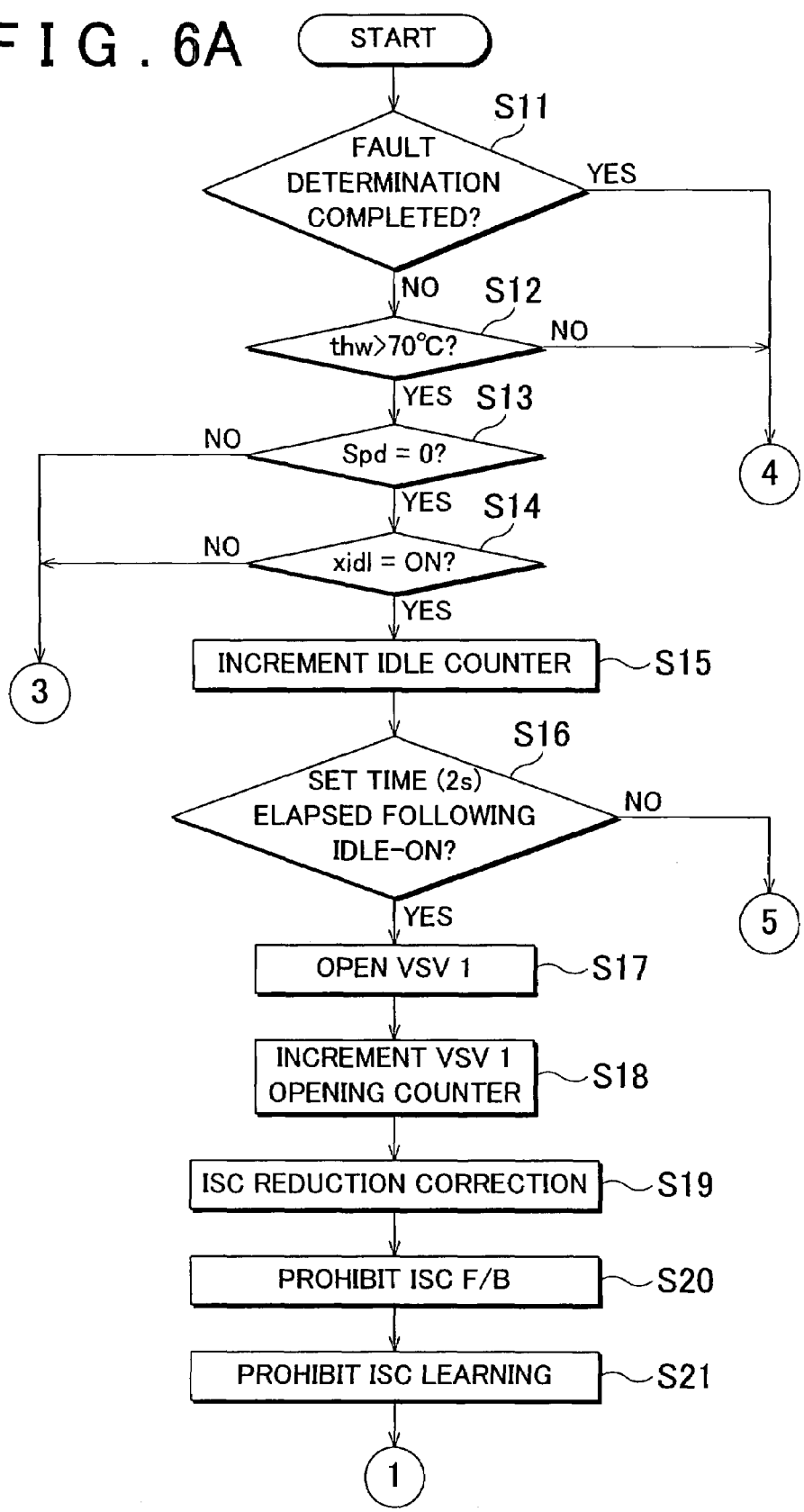
FIGS. 6A, 6B and 6C are diagram showing processes executed by an ECU 40C in the form of flowchart.
Figure 6B:
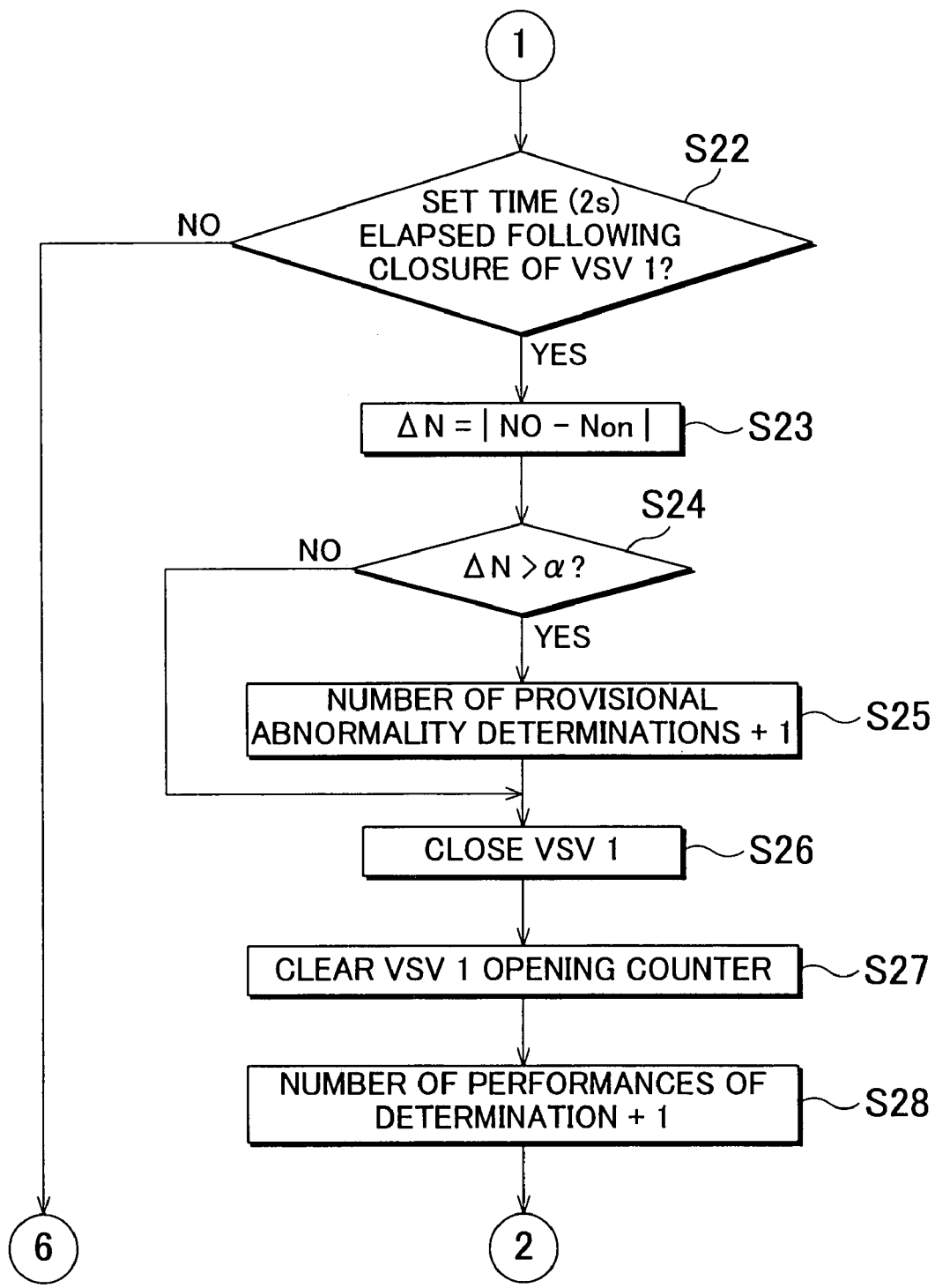
Figure 6C:
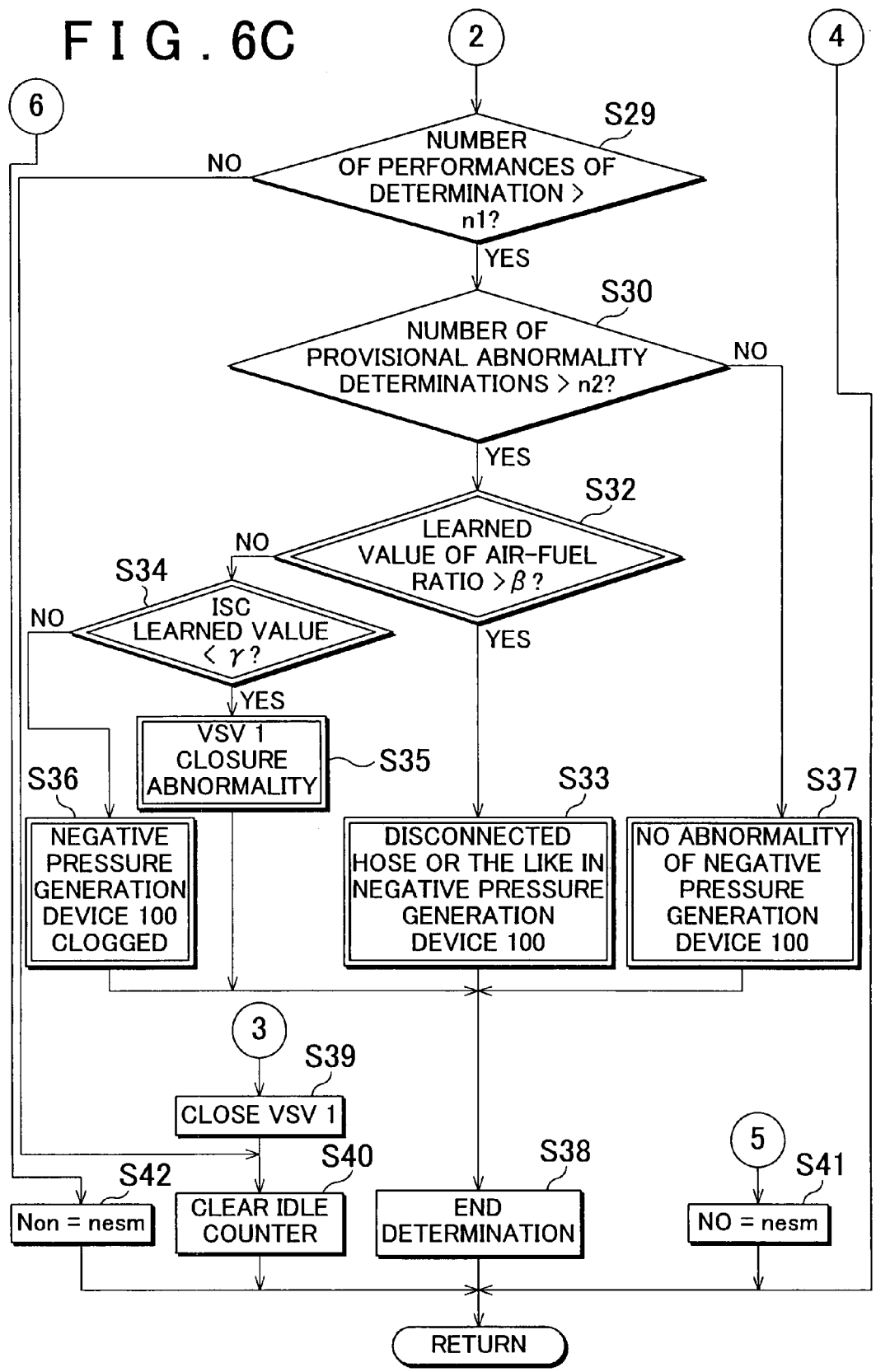
Figure 7:
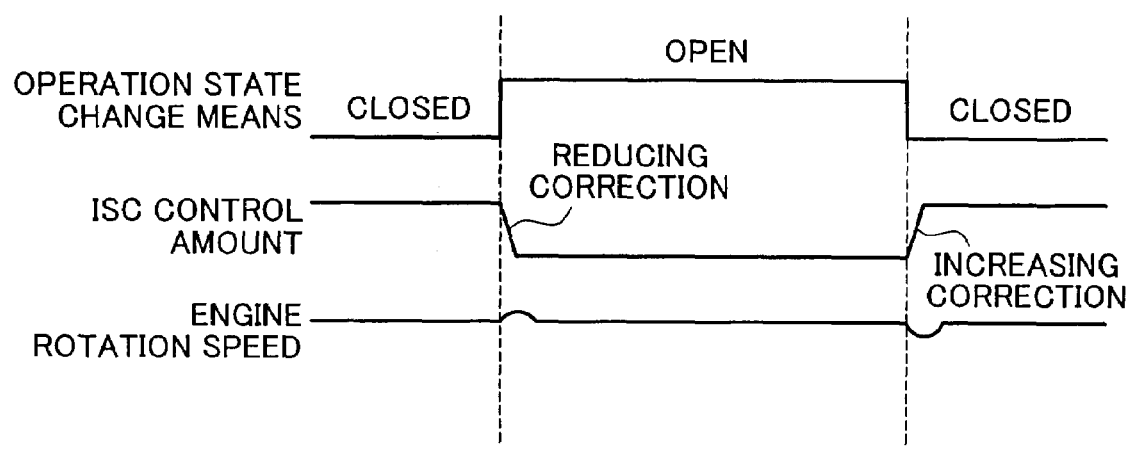
FIG. 7 is a time chart showing the state of an operation state change device, changes in the ISC control amount, and changes in the rotation speed of an internal combustion engine when an increasing/decreasing correction of the intake air flow amount is performed by an ISC control in accordance with changes in the state of operation of the operation state change device.

Next, a process executed by an ECU 40C to determine the presence/absence of an abnormality of the negative pressure generation device 100 and a cause of the abnormality will be described in detail with reference to the flowchart shown in FIGS. 6A, 6B and 6C. The flowchart in FIGS. 6A, 6B and 6C shows a series of processes in a conveniently divided fashion, and is the same as the flowchart shown in FIGS. 5A, 5B and 5C, except that steps 32 to 36 are added in place of step 31. Therefore, in this embodiment, steps 32 to 36 will be described in detail below. The CPU executes a process of determining whether or not the number of times that a provisional abnormality determination has been made is greater than or equal to a predetermined number of times n2. If an affirmative determination is made in this step, it is determined that the negative pressure generation device 100 has an abnormality, and the CPU then executes a process of determining whether or not the learned value of the air-fuel ratio is greater than the third predetermined value β (step 32).

If an affirmative determination is made in step 32, the CPU determines that a cause of the abnormality is the suction of atmospheric air by the negative pressure generation device 100 due to disconnection of the air hose 5, a crack, a hole or the like in the air hose 5, etc. (step 33), and then ends the determination process (step 38). On the other hand, if a negative determination is made in step 32, the CPU executes a process of determining whether or not the learned value related to the ISC control is smaller than the fourth predetermined value γ (step 34). It is to be noted herein that at the time of the VSV 1 opening abnormality, the intake air flow amount becomes greater than the intake air flow amount that is needed in order to maintain the target rotation speed, and therefore the intake air flow amount is decreased by the F/B control before the determination process shown in this flowchart is executed. Furthermore, since a result of this process is reflected in the learned value, the learned value becomes correspondingly smaller.

Therefore, if an affirmative determination is made in step 34, the CPU determines that a cause of the abnormality is the VSV 1 opening abnormality (step 35), and ends the determination process (step 38). On the other hand, if a negative determination is made in step 34, the CPU determines that a cause of the abnormality is the clogging of a channel in the negative pressure generation device 100 which includes the VSV 1 closure abnormality (step 36), and then ends the determination (step 38). Thus, it is possible to determine the presence/absence of an abnormality and determine the presence/absence of an abnormality and a cause of the abnormality. As a result, it becomes possible to easily find the location of abnormality and immediately cope with it and take appropriate countermeasures, for example, perform a tentative control in accordance with the cause of the abnormality, etc. Thus, the ECU 40C capable of determining the presence/absence of an abnormality of the negative pressure generation device 100, and also capable of determining a cause of the abnormality can be realized.

Although in the foregoing embodiments, the presence/absence-of-abnormality determination-purpose program is programmed so as to determine the presence/absence of an abnormality on the basis of the degree of variation ΔN that is in accordance with change in the state of operation of the VSV 1 occurring when it is opened, the program may also be programmed so as to perform the determination on the basis of the degree of variation ΔN that is in accordance with change in the operation state of the VSV 1 occurring when it is closed. In relation to this, although in the foregoing embodiments, the abnormality determination mode-purpose program is programmed so as to execute the process for opening the VSV 1 under a predetermined condition and then execute the process for closing the VSV 1, the abnormality determination mode-purpose program may also be programmed so as to execute the process for closing the VSV 1 under a predetermined condition and then execute the process for opening the VSV 1.

The foregoing embodiments are preferred embodiments of the invention. However, the invention is not limited to these embodiments, but various modifications can be carried out without departing from the spirit of the invention.

What is claimed is:

1. A fault determination device of a negative pressure generation device having an ejector that generates a first negative pressure that is greater than a second negative pressure that is to be extracted from an intake passageway of an intake system of an internal combustion engine, and an operation state change device that causes the ejector to function or stop functioning, the fault determination device determines a fault of the negative pressure generation device, the fault determination device comprising:

a presence/absence-of-abnormality determination portion that determines a presence/absence of an abnormality of the negative pressure generation device based on a variation of a rotational speed of the internal combustion engine that is in accordance with a change in a state of operation of the operation state change device;

an idle flow amount adjustment device for adjusting an intake air flow amount so as to restrain a variation of an idle rotation speed of the internal combustion engine and keeping the idle rotation speed substantially constant by an idle speed control, and wherein, when an increasing/decreasing correction of the intake air flow amount in accordance with the change in the state of operation of the operation state change device is performed by the idle speed control, the presence/absence-of-abnormality determination portion determines the presence of the abnormality if a magnitude of a degree of variation of the rotation speed of the idle internal combustion engine in accordance with the change in the state of operation of the operation state change device is greater than a predetermined value; and a feedback control prohibition portion that prohibits, if the intake air flow amount has been corrected to increase or decrease by the idle speed control in accordance with the change in the state of operation of the operation state change device, a feedback control related to the idle speed control, which adjusts the intake air flow amount based on a difference between the intake air flow amount measured by an air flow meter and a target air flow amount, when the presence/absence-of-abnormality determination portion performs the determination.

2. The fault determination device of the negative pressure generation device according to claim 1, further comprising a learning control prohibition portion that prohibits a learning control related to the idle speed control in accordance with the change in the state of operation of the operation state change device when the presence/absence-of-abnormality determination portion performs the determination.

3. The fault determination device of the negative pressure generation device according to claim 1, further comprising an abnormality cause determination portion that, if the presence/absence-of-abnormality determination portion determines the presence of the abnormality, determines a cause of the abnormality based on at least one learned value of a learned value related to an air-fuel ratio control of the internal combustion engine and of a learned value related to the idle speed control.

4. The fault determination device of the negative pressure generation device according to claim 3, wherein the abnormality cause determination portion determines a state of correction of a fuel injection control based on the learned value related to of the air-fuel ratio control of the internal combustion engine, and wherein if the abnormality cause determination portion determines that the state of correction of the fuel injection control is a state of correcting the air-fuel ratio extensively to a rich side, the abnormality cause determination portion determines that the cause of the abnormality is that suction of an atmospheric air is occurring in the negative pressure generation device.

5. The fault determination device of the negative pressure generation device according to claim 3, wherein the abnormality cause determination portion determines a state of correction of the intake air flow amount based on the learned value related to the idle speed control, and wherein if the abnormality cause determination portion determines that the intake air flow amount is being learned and corrected so that the intake air flow amount decreases, the abnormality cause determination portion determines that the cause of the abnormality is that the operation state change device has an operation failure and therefore has a channel open.

6. The fault determination device of the negative pressure generation device according to claim 3, wherein if the fuel injection control is not in a state of correcting the air-fuel ratio extensively toward a rich side and the intake air flow amount is not being learned and corrected so that the intake air flow amount decreases, the abnormality cause determination portion determines that the cause of the abnormality is that a channel is clogged in the negative pressure generation device.

7. The fault determination device of the negative pressure generation device according to claim 1, wherein the presence/absence-of-abnormality determination portion determines the presence/absence of the abnormality of the negative pressure generation device when the idle flow amount adjustment device is controlled by the idle speed control based on an operating condition and a magnitude of an electric load of an air-conditioner.

* * * * *